United States Patent [19]
Kuroda et al.

[11] Patent Number: 5,444,439
[45] Date of Patent: Aug. 22, 1995

[54] DATA SETTING SYSTEM FOR TERMINAL UNITS IN REMOTE SUPERVISORY AND CONTROLLING SYSTEM EMPLOYING DATA TRANSMISSION

[75] Inventors: Mitsunobu Kuroda; Susumu Nakano; Osamu Yamada; Osamu Iijima; Motoharu Terada, all of Kadoma, Japan

[73] Assignee: Matsushita Electric Works, Ltd., Osaka, Japan

[21] Appl. No.: 272,299

[22] Filed: Jul. 8, 1994

Related U.S. Application Data

[63] Continuation of Ser. No. 933,102, Aug. 21, 1992, abandoned, which is a continuation of Ser. No. 729,799, Jul. 10, 1991, abandoned, which is a continuation of Ser. No. 407,289, Sep. 14, 1989, abandoned.

[30] Foreign Application Priority Data

| Sep. 27, 1988 | [JP] | Japan | 63-241734 |
| Sep. 27, 1988 | [JP] | Japan | 63-241735 |
| Sep. 27, 1988 | [JP] | Japan | 63-241736 |
| Sep. 27, 1988 | [JP] | Japan | 63-241737 |
| Oct. 26, 1988 | [JP] | Japan | 63-270128 |
| Oct. 26, 1988 | [JP] | Japan | 63-270129 |
| Nov. 25, 1988 | [JP] | Japan | 63-299003 |
| Jun. 27, 1989 | [JP] | Japan | 1-164412 |

[51] Int. Cl.[6] ............................................. G05B 23/02
[52] U.S. Cl. ...................... 340/825.07; 340/825.72; 359/148; 455/14
[58] Field of Search ............... 340/310 R, 310 A, 531, 340/541, 547, 825.26, 825.07, 825.15, 825.17, 825.18, 825.22, 825.72, 825.52; 455/51, 14, 38.7, 49.1, 352; 320/9; 359/142, 143, 148

[56] References Cited

U.S. PATENT DOCUMENTS

| 4,704,607 | 11/1987 | Teather et al. | 340/825.07 |
| 4,737,770 | 4/1988 | Brunius et al. | 340/531 |
| 5,008,662 | 4/1991 | Tokizane et al. | 340/825.07 |
| 5,109,222 | 4/1992 | Weity | 340/825.72 |

*Primary Examiner*—Michael Horabik
*Attorney, Agent, or Firm*—Burns, Doane, Swecker & Mathis

[57] ABSTRACT

A data setting system for terminal units using an optical wireless signal includes in the respective terminal units a data storing device and a receiving device for the optical wireless signal and, in a data operating device separate from the terminal units, an operating device for preparing and transmitting a setting signal to the terminal units. The setting of data in the respective terminal units employed in a remote supervisory and controlling system using a multiplex data transmission is thereby possible from a remote position from the terminal units through the optical wireless signal.

19 Claims, 16 Drawing Sheets

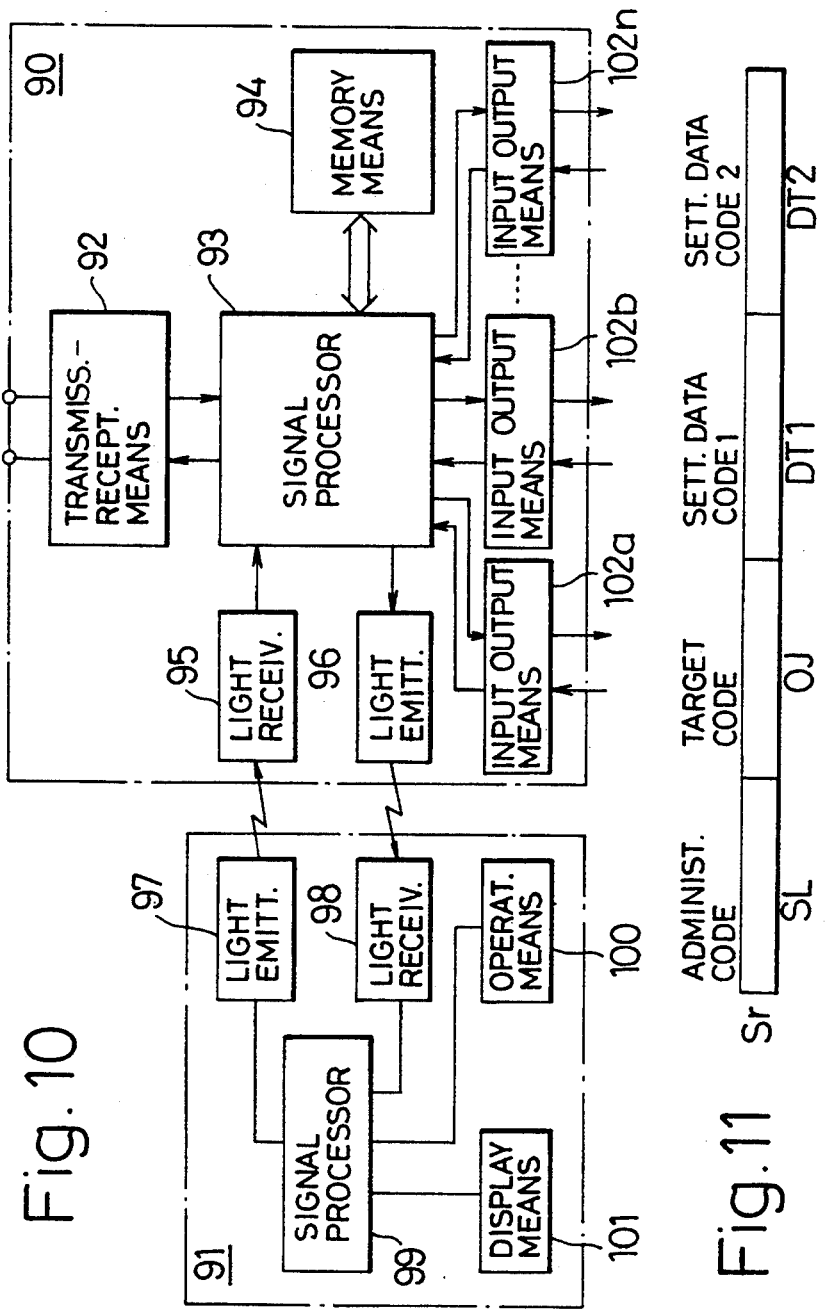

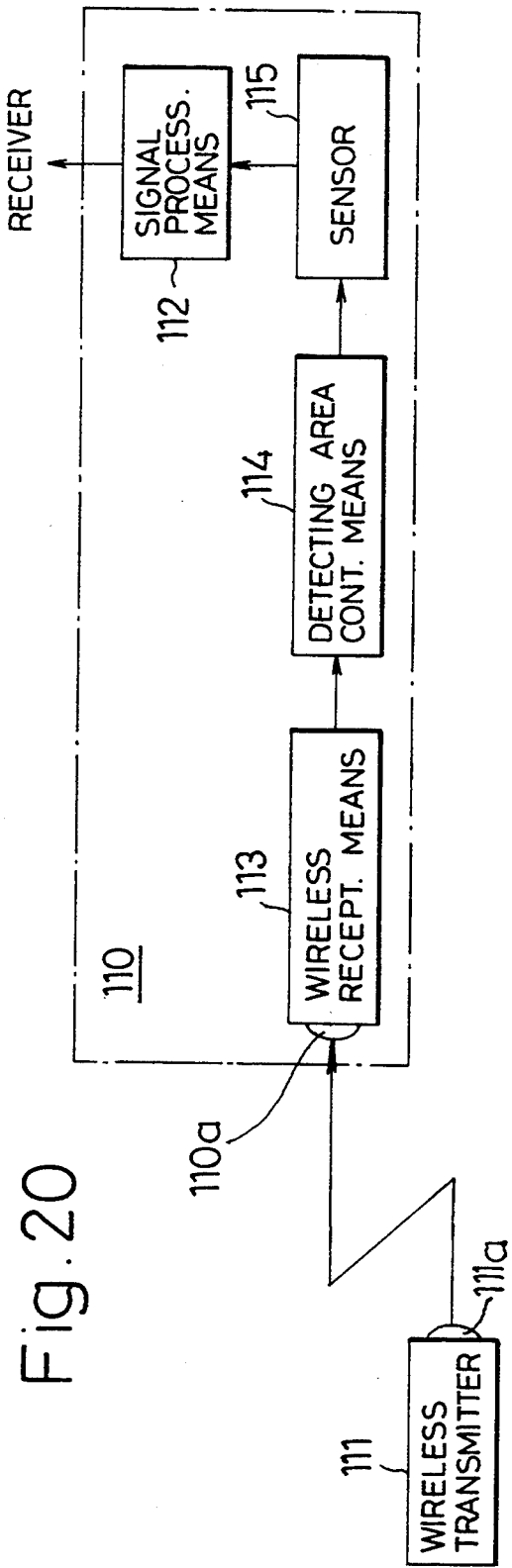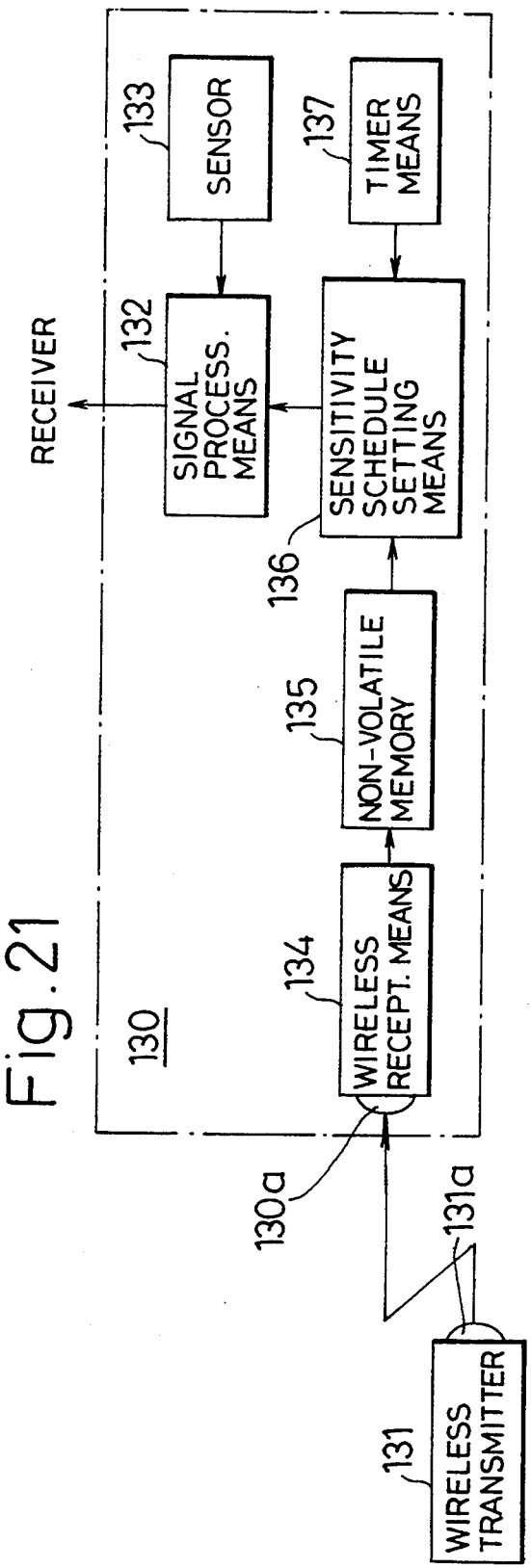

DATA SETTING SYSTEM FOR TERMINAL UNITS IN REMOTE SUPERVISORY AND CONTROLLING SYSTEM EMPLOYING DATA TRANSMISSION

This application is a continuation of application Ser. No. 07/933,102, filed Aug. 21, 1992, now abandoned, which is a continuation of application Ser. No. 07/729,799, filed Jul. 10, 1991, now abandoned, which is a continuation of application Ser. No. 07/407,289, filed Sep. 14, 1989, now abandoned.

BACKGROUND OF THE INVENTION

This invention relates to data setting systems for terminal units in remote supervisory and controlling system and, more particularly, to a system for setting data for the terminal units in the system for remotely supervising and controlling loads on the terminal units connected respectively through a two-wire line to a central control unit for time-divisional, multiplex transmission of supervisory, controlling and the like data.

The remote supervisory and controlling system of the kind referred to is effectively employed in lighting control system, fire and security system or the like which is installed within constructs.

1. Disclosure of Prior Art

In the supervisory and controlling system of the kind referred to, the terminal units are provided respectively with an adjustable setting element so that various data can be stored in a memory section within the terminal unit normally through manual operation of the element or the data thus stored can be modified. When, on the other hand, the installed location of the terminal unit is such a place as a room ceiling, an extremely narrow space or the like where the unit is not easily accessible for a system operator, the data storing or modifying operation has been made extremely complicated.

In U.S. Pat. No. 4,535,333 to Joseph W. Twardowski, there has been suggested a controlling apparatus employing a so-called transceiver system for use in a remotely controlled opening and closing garage door and the like, in which the data setting or modification is carried out between a transmitter and a receiver included in the system so that the garage door opening and closing in any desired manner can be realized. Further, another system has been suggested in U.S. Pat. No. 4,807,052 to Toshio Amano, in which an object to be remotely controlled, for example, is provided with a nonvolatile memory so as to be operable as controlled in accordance with stored data in the memory, the control data being written in the nonvolatile memory or being modified in response to an optical wireless transmission from a writing means.

However, while either one of the foregoing U.S. patents allows the control data or the like in the receiver or the controlled object to be written and transcribed, i.e., modified from a remote position, the Twardowski patent still has not been at a level adaptable to the optical wireless transmission and reception, and the Amano patent has been still far from suggesting the time-divisional, multiplex transmission of the supervisory, controlling and the like data or, in particular, any address setting system though the optical wireless transmission and reception system has been thereby suggested. Accordingly, it has been demanded to provide a data setting system for the terminal units in the remote supervisory and controlling system employing the multiplex data transmission, the setting system allowing the address data and the like data settable by means of the optical wireless transmission and reception, so as to improve the remote supervision and control.

2. Technical Field

A primary object of the present invention is, therefore, to provide a system which can readily set from a remote position the data in the terminal units provided respectively with a nonvolatile memory by means of the optical wireless transmission and reception in the remote supervisory and controlling system employing the multiplex transmission.

According to the present invention, this object can be realized by a data setting system for terminal units in a remote supervisory and controlling system in which a plurality of the terminal units having each a set address are connected through a two-wire line to a central control unit, and a time-divisional and multiplex data transmission is carried out between the central control unit and the terminal units with a transmission signal transmitted from either the central control unit or the terminal units, wherein each of the terminal units is provided with a memory for holding various function data and a light receiver for receiving an optical wireless signal including said data to be written in the memory, the optical wireless signal being prepared in an operating means provided separately from the terminal units for transmission to them, and the function of the respective terminal units is changed over in response to the function data in the memory.

Other objects and advantages of the present invention shall become clear from following description of the present invention detailed with reference to embodiments shown in accompanying drawings.

BRIEF EXPLANATION OF THE DRAWINGS

FIG. 10 is a block diagram showing a further embodiment of the data setting system according to the present invention;

FIG. 11 is an operation explanatory diagram for an example of a format of the optical wireless signal from the operating means to the terminal units in the system of FIG. 10;

FIG. 12 is a diagram showing an example of arrangement of target code used in the system of FIG. 10;

FIG. 20 is a block diagram showing still another embodiment of the data setting system according to the present invention;

FIG. 21 shows in a block diagram yet another embodiment of the system according to the present invention;

Figure 1:
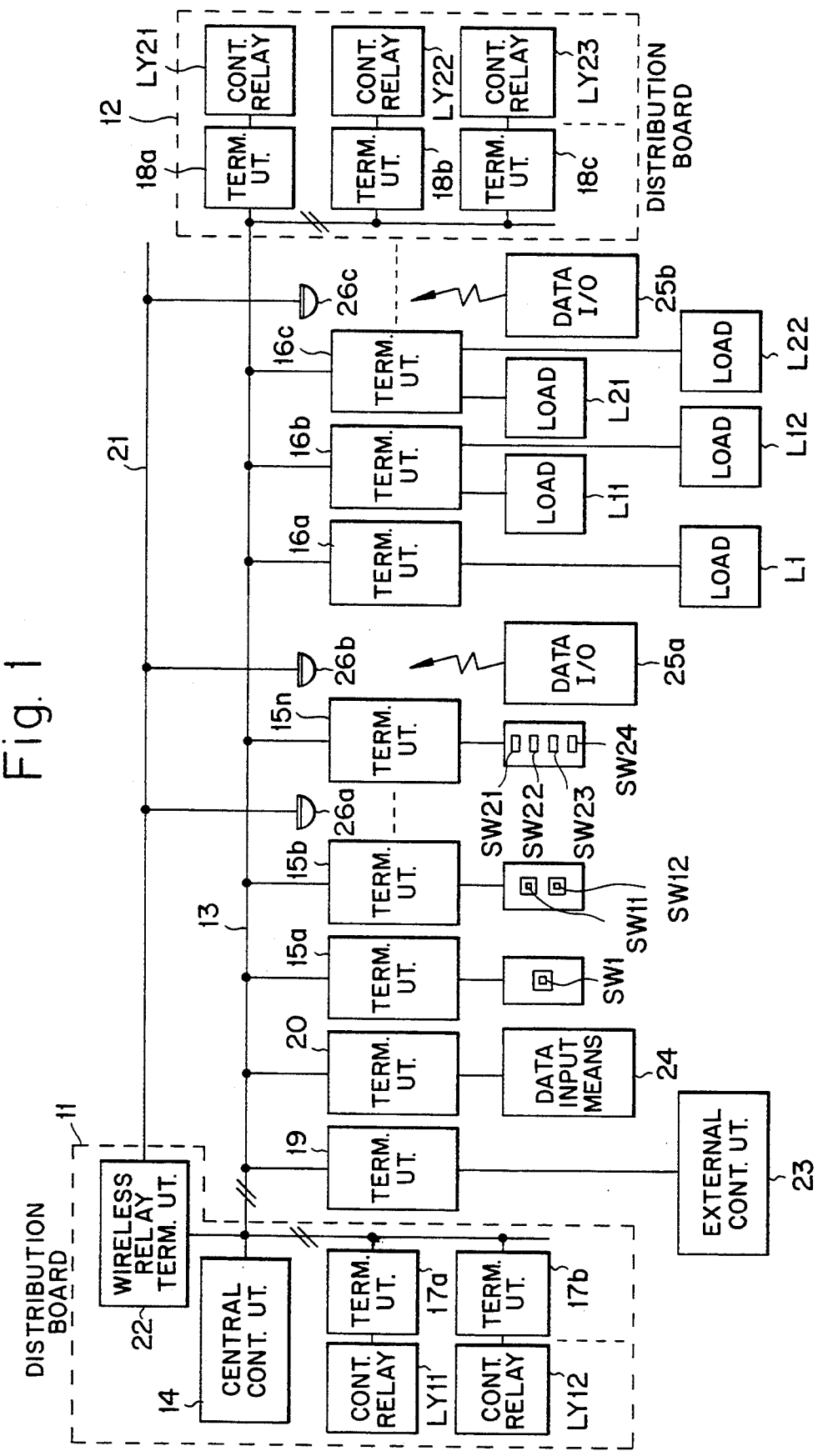
FIG. 1 is a block diagram showing general arrangement of the remote supervisory and controlling system employing the multiplex data transmission, in which the data setting system for the terminal units according to the present invention is employed.

While the present invention shall now be explained with reference to the respective embodiments shown in the drawings, it should be appreciated that the intention is not to limit the invention only to these embodiments shown but rather to include all alterations, modifications and equivalent arrangements possible within the scope of appended claims.

DISCLOSURE OF PREFERRED EMBODIMENTS

Before describing in detail the data setting system for the terminal units according to the present invention, the remote supervisory and controlling system employing the multiplex data transmission and the system of the present invention as applied thereto shall be explained for promotion of better understanding of the invention. Referring now to FIG. 1, this remote supervisory and controlling system generally comprises, for example, a distributing board 11, a relay controller 12, a two-wire signal line 13 connecting between the board 11 and the controller 12, and a central control unit 14 included in the distributing board 11 and connected to the signal line 13, while such various terminal units as supervisory terminal units 15a, 15b . . . 15n, controlling terminal units 16a, 16b . . . , 17a, 17b and . . . , 18a, 18b . . . , an external-interface connecting terminal unit 19, a pattern setting terminal unit 20 and so on are connected to the signal line 13, the respective terminal units being properly disposed in, for example, respective rooms or the like of a structure and each having an individual address set therefor. Further, an optical wireless data signal line 21 and a data relaying terminal unit 22 connected thereto are connected to the signal line 13. In the present instance, such switches SW1, SW11, SW12 and SW21-SW24 as wall switches installed on room walls are connected respectively alone or jointly to each of the terminal units 15a, 15b . . . 15n, loads L1, L11, L12, L21 and L22 and remote control relays LY11, LY12, LY21, LY22 and LY23 are connected to the controlling terminal units 16a, 16b . . . , 17a, 17b . . . and 18a, 18b . . . , an external control unit 23 is connected to the external-interface connecting terminal unit 19, and a data input means 24 is connected to the pattern setting terminal unit 20. Further, connected to the data relaying terminal unit 22 through the data signal line 21 are optical wireless receivers 26a-26c which receive optical signals from optical wireless transmitters 25a, 25b . . . transmitting data input/output.

Figure 2:
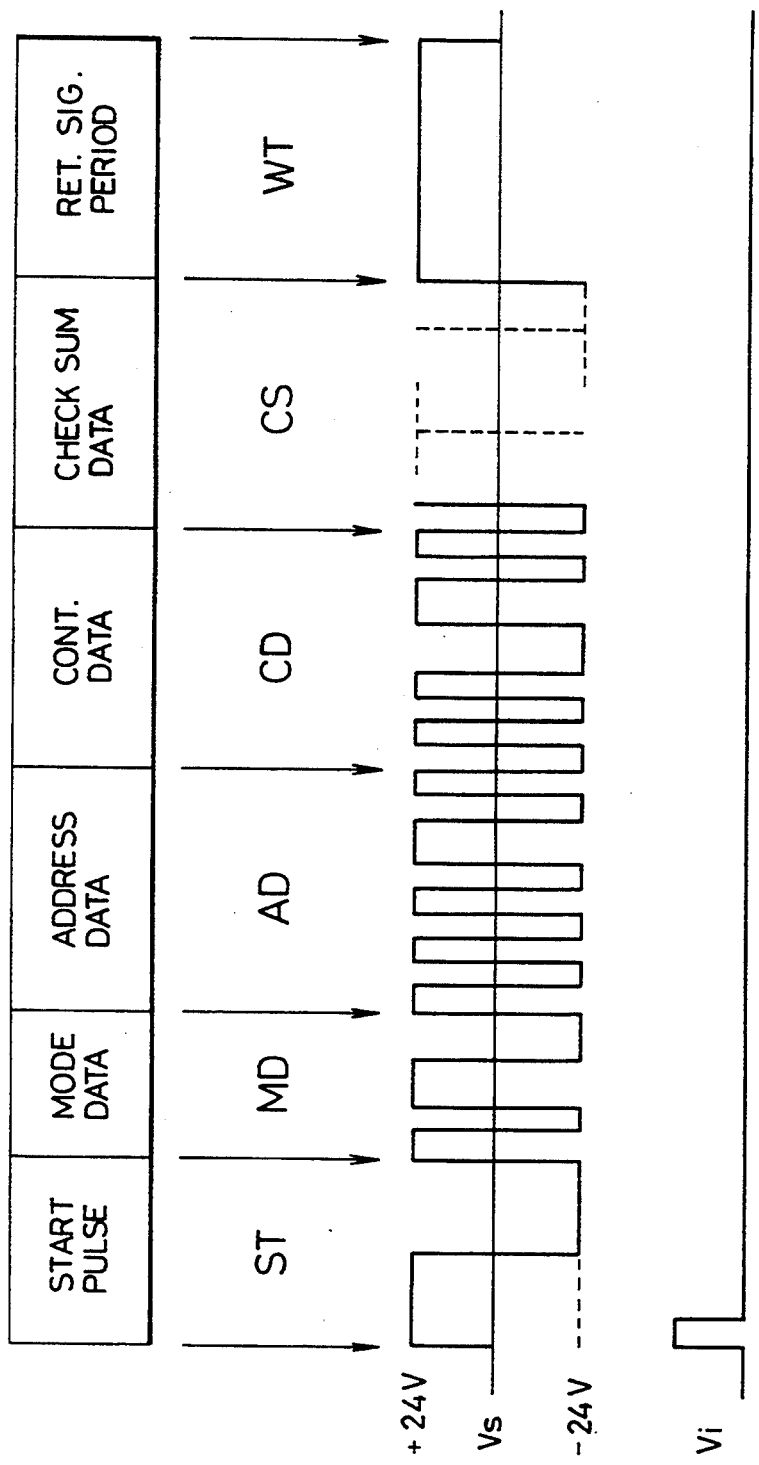
FIGS. 2(a) and 2(b) are diagrams showing a format of the transmission signal, for explaining the operation of the system of FIG. 1.

In this system, transmission signal Vs provided out of the central control unit 14 to the signal line 13 comprises, as shown in FIG. 2(a), a start pulse signal ST denoting signal transmission starting, a mode data signal MD denoting signal mode, an address data signal AD which transmits address data for calling the respective terminal units, control data signal CD which transmits data for controlling the loads L1, L11, L12, L21 and L22, check sum data CS, and a reply signal period WT for setting the period in which the signals are returned from the respective terminal units, which signals are bipolar, time-divisional multiplex signals of ±24 V and arranged for transmission of the data with pulse width modulation. On the other hand, each of the terminal units is so provided that, when its own set address data coincide with the address data of the transmission signal Vs received through the two-wire signal line 13, the unit will take up the control data of the received transmission signal Vs and will return its supervisory data signal as a current mode signal (a signal sent out as short-circuited through a proper low impedance in the signal line 13) to the central control unit 14 in synchronism with the reply signal period WT of the transmission signal Vs. The central control unit 14 includes a dummy signal sending means which is always sending out a dummy transmission signal with the mode data signal MD made to be a dummy mode, and an interruption processing means which, upon receipt of such interruption signal Vi as in FIG. 2(b) is returned from any one of the terminal units, detects the particular terminal unit that has generated the interruption signal and gains access to this terminal unit so as to have its own supervisory data returned therefrom.

On the basis of the supervisory data respectively returned to the central control unit 14 in the foregoing manner from the supervisory terminal units 15a, 15b . . . 15n, external-interface connecting terminal unit 19, pattern setting terminal unit 20 or optical wireless data relaying terminal unit 22, the central control unit 14 prepares the control data to be transmitted to any one or ones of the controlling terminal units 16a, 16b . . . , 17a, 17b . . . and 18a, 18b . . . which controls or control corresponding one or ones of the loads L1-L22 controls relays LY11-LY12, and controls relays LY21-LY23, respectively, and transmits the thus prepared control data in the time-divisional multiplex transmission through the signal line 13 to the particular controlling terminal unit or units so as to have the corresponding load or loads L1-L22 optimumly controlled. When appropriate data are transmitted at this time from the optical wireless transmitters 25a and 25b to the optical wireless receivers 26a-26c, the data are transferred through the signal line 21 and the data relaying terminal unit 22 to the central control unit 14. The external-interface connecting terminal unit 19 is provided for the data transmission with respect to the external control unit 23, and the pattern setting terminal unit 20 is provided for transferring the pattern control data provided as an input from the data input means 24 to the central control unit 14.

Since the terminal units of a variety of functions are employed concurrently in the foregoing system and a provision of an interface with respect to every terminal unit renders the entire system arrangement too complicated, it is preferable to provide in the respective terminal units an input/output means and a memory for storing a proper parameter so as to have a function in accordance with this parameter accomplished. For this parameter, there may be enumerated such ones corresponding to, for example, the address specific to the terminal unit, the type of the terminal unit (for supervisory use, controlling use and so on), input polarity (positive logic and negative logic), input latch mode (rising latch, change point latch, latch accompanied by change point correction and the like), input sampling time (the number of times), output polarity (positive logic and negative logic), output mode (single relay driving output, latching relay driving output, one-shot pulse output, flicker lamp driving output and the like), output time (relay driving time), reply output mode (three-way setting, bit division and the like), dimming mode (phase control dimmer, inverter control dimmer and the like), delay time for one-shot or delayed lighting and so on. In the above, parenthesized parameters represent factors which are changeable.

Here, it has been the demand that the storage of the data in the memory of the terminal unit or any modification of the data stored in the memory can be attained from a remote position. According to the present invention, there can be provided a data setting system for the terminal units which satisfies the above demand and can be employed in the remote supervisory and controlling system shown in FIG. 1.

Figure 3:
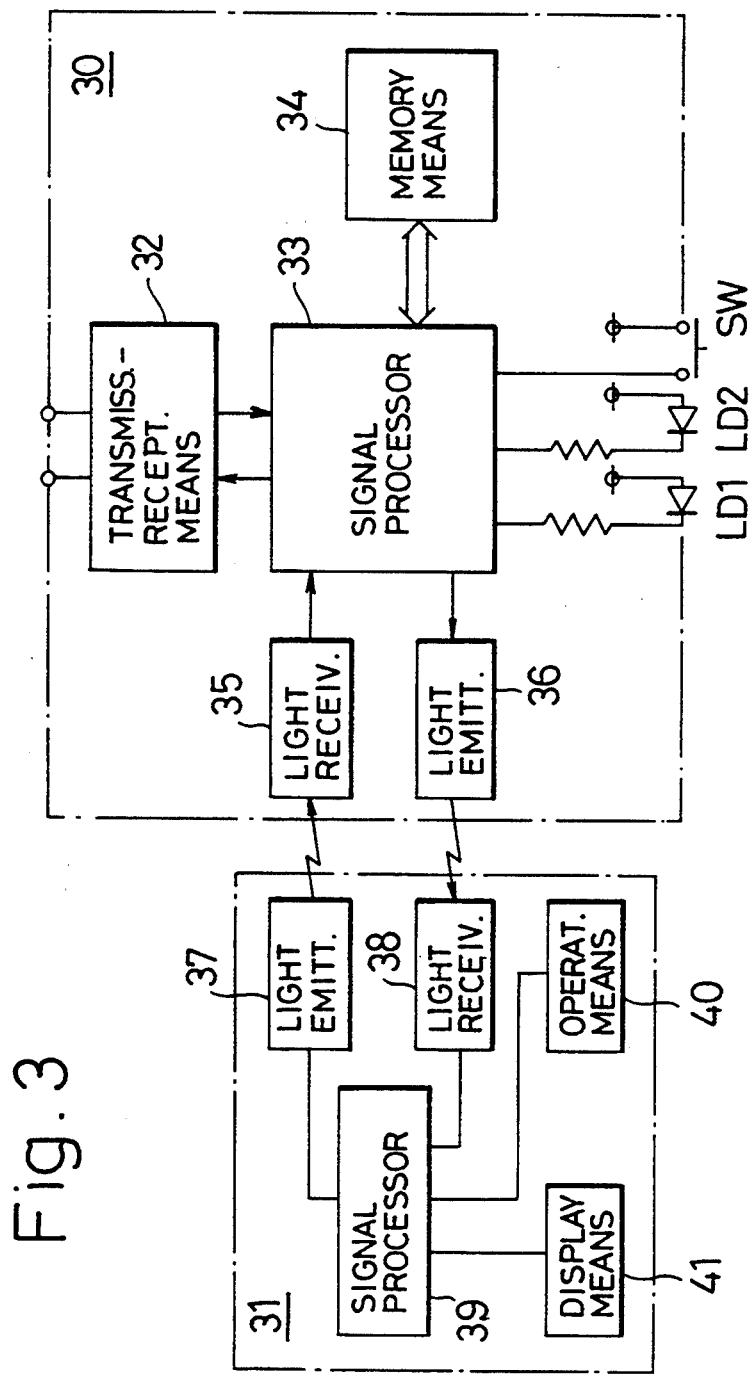
FIG. 3 is a block diagram showing an embodiment of the data setting system for the terminal units according to the present invention.

Referring next to FIG. 3, there are shown a terminal unit 30 employable as the supervisory terminal units 15a, 15b . . . 15n in the foregoing system, and an operating device 31. This terminal unit 30 comprises a transmission and reception means 32 for transmitting and receiving the foregoing transmission signal Vs transmitted through the two-wire signal line 13 in the system of FIG. 1, a signal processor 33 incorporating an interface and carrying out various data processing, and a memory means 34 for setting contents of the data processed at the signal processor 33. The terminal unit 30 is further provided with a light receiver 35 and a light emitter 36 for transmitting and receiving such optical wireless signal as infrared rays with respect to the operating means 31, and with light emitting diodes LD1 and LD2 which indicate ON and OFF states of a load L and such switch SW as a wall switch.

Here, the signal processor 33 preferably comprises a microcomputer, which is arranged for comparison of the address data provided from the central control unit 14 in the system of FIG. 1 with the preliminarily set address data in the terminal unit 30, reading the ON or OFF state of the switch SW upon coincidence of the both address data, and returning the read state as the supervisory signal to the central control unit in synchronism with the return wait signal. The address data set in this terminal unit 30 may be made settable by connecting a DIP switch to the signal processor 33, but it is preferable that the data are written in the memory means 34 to be thereby made utilizable. For the memory means 34, a nonvolatile EEPROM should optimumly be employed, and this means 34 is so provided as to operate in accordance with the foregoing parameter as a sort of memory switch that changes over the processing carried out in the signal processor 33. Required programs for the various functions should preferably be provided in the signal processor 33 along with the interface, while they may be contained in the memory means 34.

In the operating device 31 such as a remote control unit, further, there are provided a light emitter 37 and a light receiver 38 for transmitting and receiving the optical wireless signal between the device 31 and the terminal unit 30, and the optical wireless signal transmitted out of the light emitter 37 is prepared with an input signal from an operating means 40 and processed at a signal processor 39 within the device 31. The optical wireless signal received at the light receiver 38 is also processed at the signal processor 39, and the device 31 is provided with a display means 41 for displaying the thus processed signal.

Figure 4:
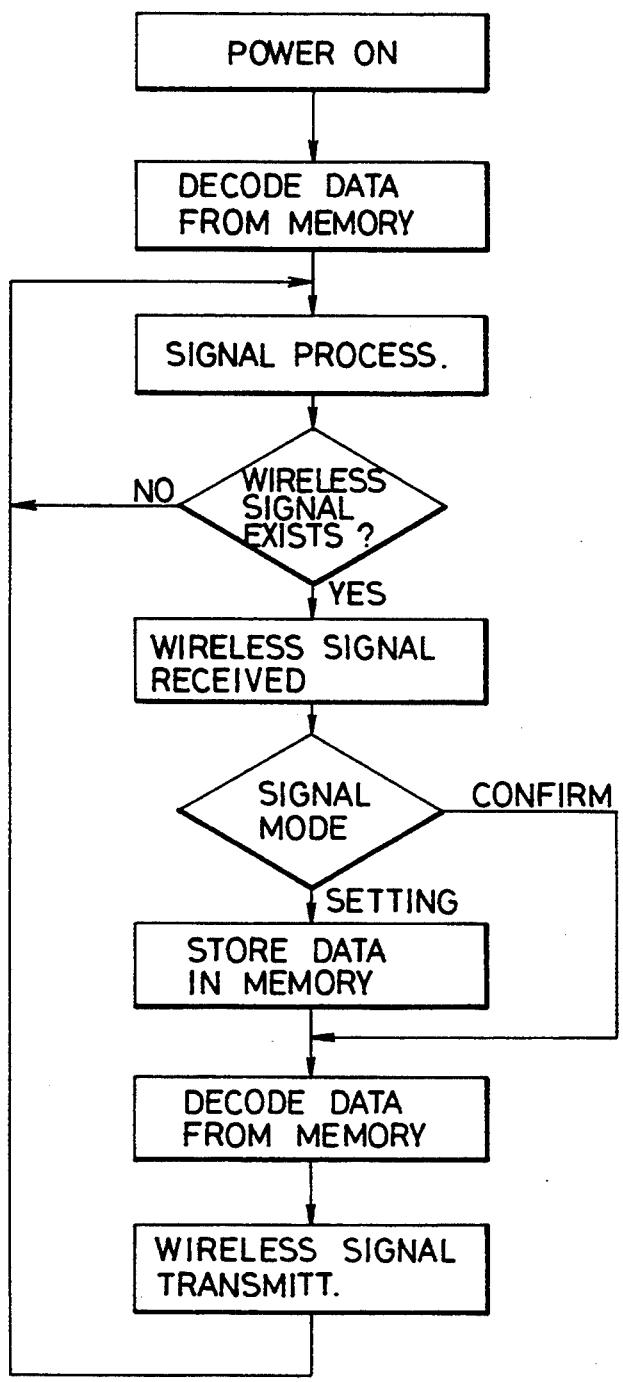
FIG. 4 is a flow chart for explaining the operation of the system of FIG. 3.

Basic operation of the data setting system for the terminal units as shown in FIG. 3 shall be explained next with reference to FIG. 4. As the terminal unit 30 is connected with an electric power source, the data stored in the memory 34 are read out to set the function of the terminal unit 30, an ordinary operation is carried out in accordance with the thus set function and, during this operation, a detection is made whether or not the optical wireless signal is received. Upon receipt of the optical wireless signal and if its mode is of setting mode, the signal is written in the memory means 34 and thereafter the data in the memory means 34 are read out to be returned to the operating device 31. If the optical wireless signal from the operating device 31 is of confirmation mode, the data in the memory means 34 are read out in the terminal unit 30 and are returned as the optical wireless signal to the operating device 31. In either event of the setting mode or the confirmation mode, the data of the received optical wireless signal are displayed at the display means 41 in the operating device 31 so that the operator can always confirm the data. With this unique operating device 31 according to the present invention, therefore, the setting and confirmation with respect to the memory means 34 can be smoothly carried out.

Figure 5:
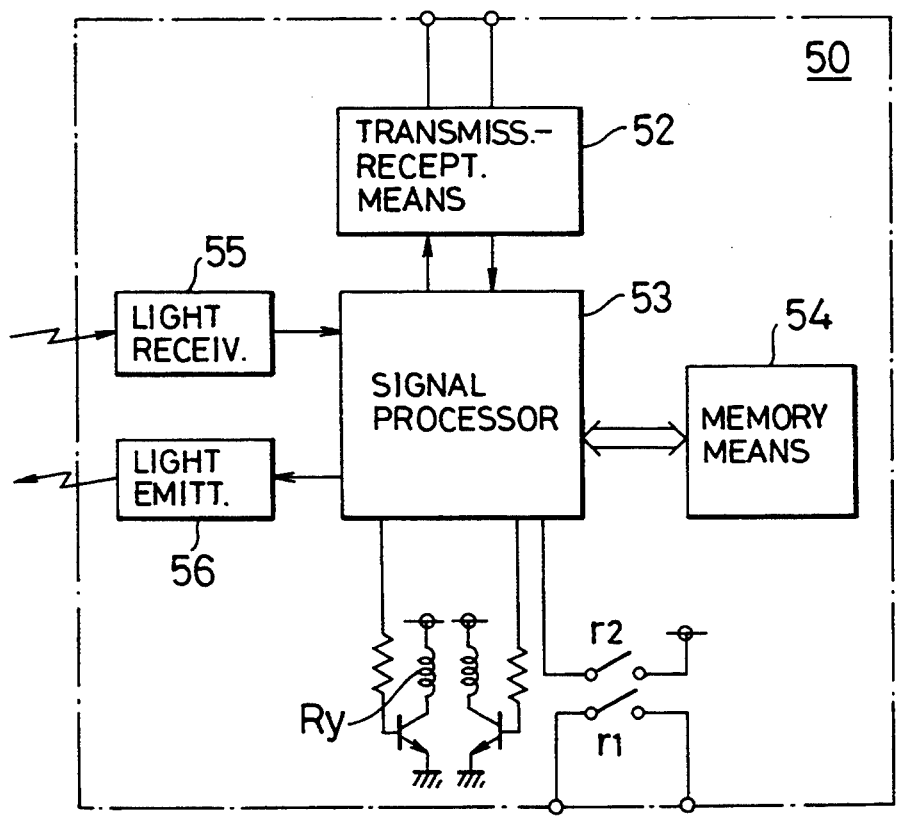
FIG. 5 is a block diagram showing another embodiment of the data setting system according to the present invention.

In FIG. 5, there is shown an embodiment which is substantially the same as the supervisory terminal unit but is to be used as a controlling terminal unit 50, in which a latching type relay Ry having main and auxiliary contacts r1 and r2 is connected to a signal processor 53 in place of the foregoing switch SW and light emitting diodes LD1 and LD2. In the present instance, the arrangement is so made that a load is made ON and OFF at the main contact r1 of the latching relay Ry, and the ON and OFF state of the load can be returned with the auxiliary contact r2. Other arrangement and operation are the same as those in the embodiment of FIG. 3, and the same constituents in FIG. 5 as those in FIG. 3 are denoted by the same reference numerals employed in FIG. 3 but as added by 20.

It should be appreciated that the functions set for the memory means 34 and 54 in embodiments of FIGS. 3 and 5 are such matters enumerated in the foregoing as the parameters to be stored in the memory means.

Figure 6:
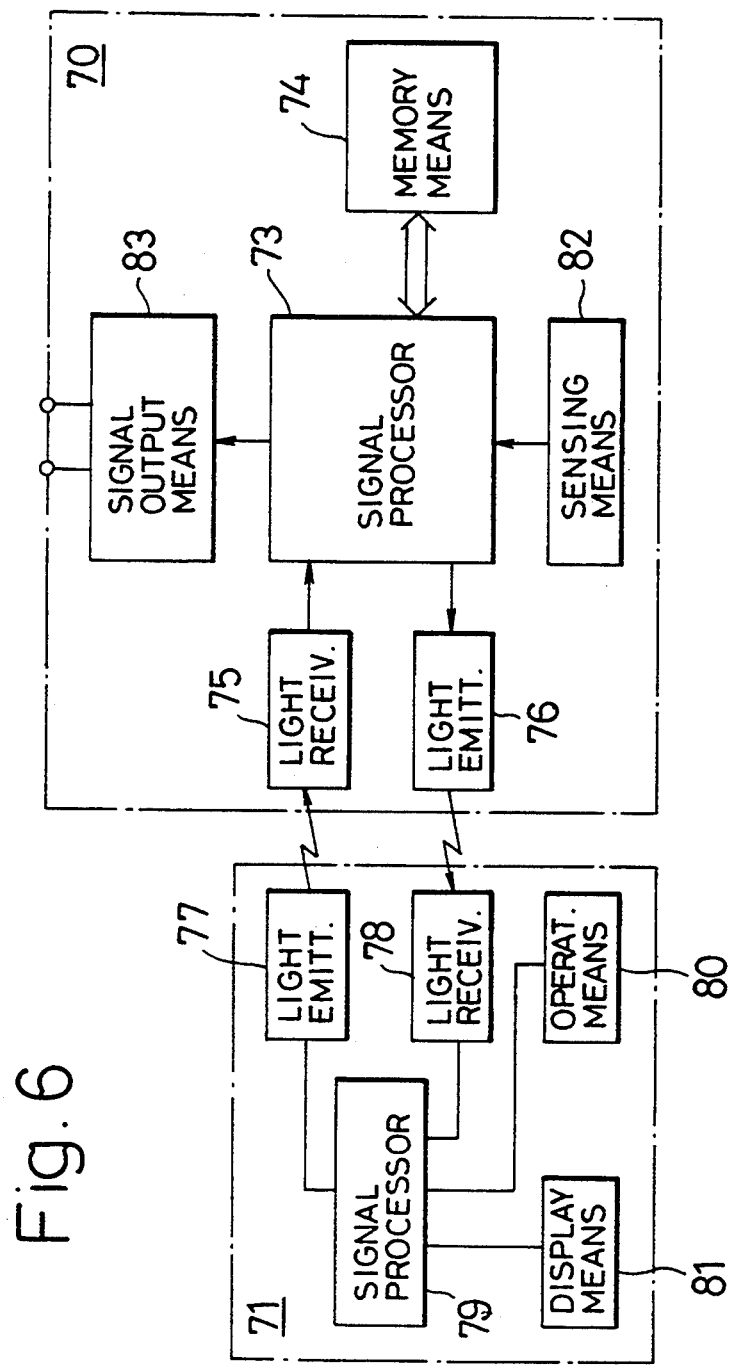
FIG. 6 shows in a block diagram still another embodiment of the data setting system of the present invention.

According to another feature of the present invention, there is provided a data setting system the terminal units of which are to be employed as fire and security sensors. Referring to FIG. 6, a fire and security sensor 70 in the present embodiment includes a sensing means 32 as connected to a signal processor 73, in place of the switch SW and light emitting diodes LD1 and LD2 in the terminal unit 30 of FIG. 3. This sensing means 82 is provided for carrying out any one or a combination of two or more of various detecting operations for fire, smoke, gas leakage and invader, so that an analog output of the sensing means 82 will be provided to the signal processor 73 for a judgement as to whether or not such detection output is abnormal. To the signal processor 73, an alarm signal output means 83 is connected in place of the transmission and reception means 32 in the embodiment of FIG. 3, and the detection signal of any abnormality is transmitted through the alarm signal output means 83 and the two-wire signal line 13 as in FIG. 1 to the central control unit 14. Other arrangements including an operating means 71 and their operation are the same as those of the embodiment of FIG. 3, and the same constituents as those in the embodiment of FIG. 3 are denoted in FIG. 6 with the same reference numerals as in FIG. 3 but as added by 40.

Figure 7:
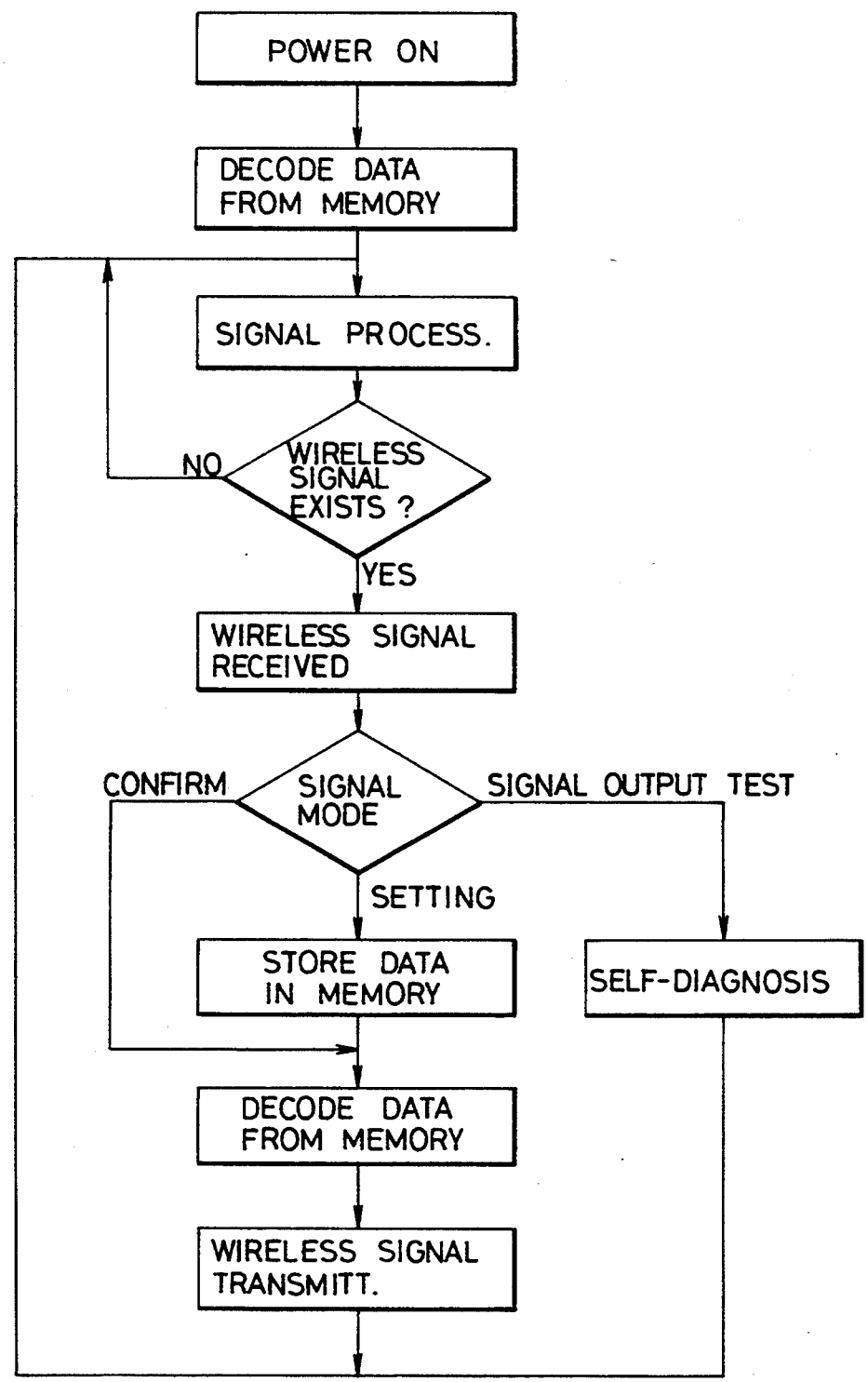
FIG. 7 is a flow chart for explaining the operation of the system of FIG. 6.

A basic operation of the data setting system for the fire and security sensors as shown in FIG. 6 shall now be explained with reference to FIG. 7. When the power source is connected, the data in the memory means 74 are read out to set the function of the fire and security sensor 70, any input from the sensing means 82 is supervised in accordance with the set function, and whether or not the optical wireless signal is received in the meantime is determined. Upon detection of the optical wireless signal, the data of the detected signal are written in the memory means 74 in the event of the setting mode, thereafter the data in the memory means 74 are read out, and the read out data are returned to the operating means 71 as the optical wireless signal. In the event that the signal from the operating means 71 is of the confirmation mode, the sensor 70 reads the data out of the memory means 74 to return them to the operating means 71 as the optical wireless signal. In either event of the setting and confirmation modes, the data of the received optical wireless signal are displayed at the display means 81 in the operating means 71 for ready confirmation by the operator all the time. In the event where the optical wireless signal from the operating means 71 is of alarm signal output mode, the fire and security sensor 70 carries out a self-checking and thereafter transmits an alarm signal through the alarm signal output means 83.

In the embodiment of, for example, FIG. 6, it is possible to include in a set value as the data stored in the memory means 74 such a correction value or a detection sensitivity adjusting value so as to be able to adjust any fluctuation in the detection sensitivity due to any fluctuation involved in the accuracy of parts upon manufacture of them. That is, in adjusting the detection sensitivity upon the manufacturing, an optimum correction value is made to be stored in the memory means in place of conventional semi-fixed resistor or variable capacitor, for carrying out a computation at the signal processor 73 with the correction value employed, and the detection sensitivity adjustment can be electrically automatically accomplished.

In the fire and security sensor 70 shown in FIG. 6, further, it is preferable that the arrangement is so made that detection level can be optimumly discriminated for reducing any possibility of erroneous alarming or misalarming, and that a time for which the detection level exceeds a predetermined value or, in other words, the time in which the data are accumulated can be discriminated. Further, while the sensing means 82 may be one of various types, the means in the present instance is so provided that the type of the sensing means 82 is set in the memory mean and the signal processing at the signal processor 73 is made selectable in accordance with the set type, to thereby allow the same signal processor 73 to be applicable to various types of the sensing means 82 to render required parts commonly utilizable. In addition, the foregoing fire and security sensor 70 may be provided as directly connected to the two-wire signal line 13 of FIG. 1, in such manner as a so-called point address sensor, in which event a position where the alarm signal is generated can be discriminated highly precisely. In this case, the writing of the data in the memory means 74 in the sensor 70 or the modification of the data stored therein can be smoothly attained from a remote position, and required installing work of the system for the purpose of the fire and security can be simplified, as will be readily appreciated.

Figure 8:
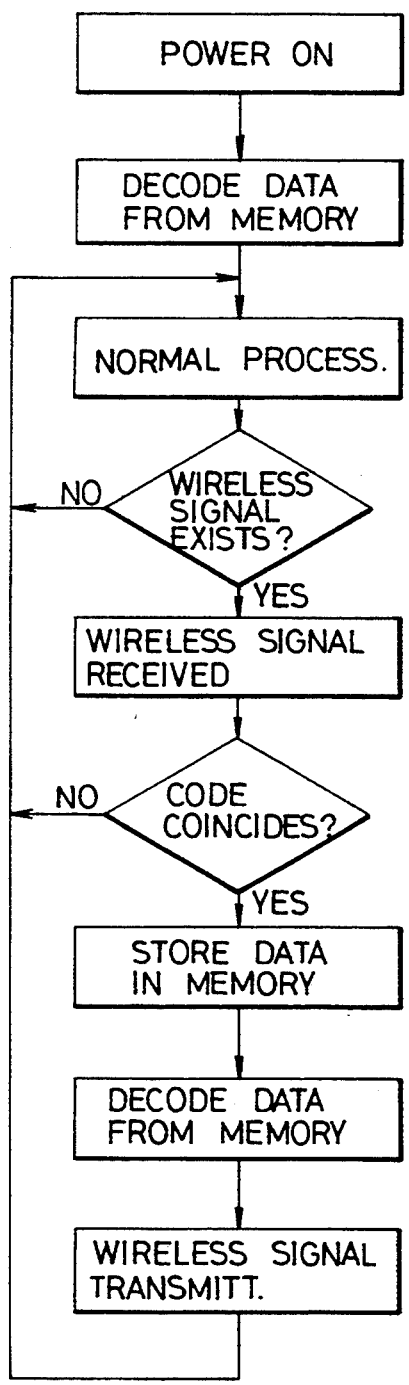
FIGS. 8 and 9 are flow charts for explaining the operation of further embodiments of the data setting system according to the present invention.
Figure 9:
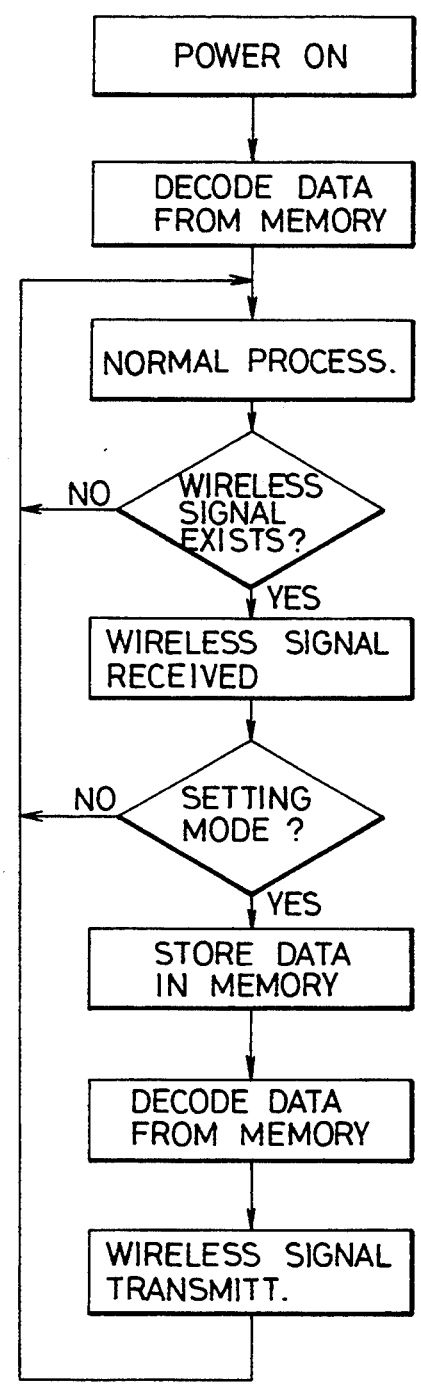

According to another feature of the present invention, there can be provided an arrangement for preventing any intentional set-data modification by a third person, upon writing the data in the memory means in the terminal unit. In another embodiment attaining this object, such supervisory terminal units and controlling terminal units as shown in FIGS. 3 and 5 as well as such fire and security sensor terminal unit as shown in FIG. 6 can be employed. Referring to this embodiment with reference to FIG. 8, a code specific to the system is preliminarily stored in the memory means of the respective supervisory and controlling terminal units of FIGS. 3, 5 and 6 and, as will be clear when FIG. 4 relative to the embodiment of FIG. 3 is compared, it is judged whether or not the optical wireless signal received coincides with the specific system code. When the coincidence is acknowledged, the data are written in the memory means, thereafter the data in the memory means are read out and the optical wireless signal is returned to the operating means, whereas in the absence of the coincidence no data write in the memory means takes place. Other operational features of this embodiment are the same as those in the embodiment of FIG. 3. While the present embodiment is made to write the specific code in the memory means of the respective terminal units according to the particular feature of the invention, the arrangement may also be made to have the specific codes to the system set in such central control unit 14 as shown in FIG. 1 so that, upon coincidence of the code provided to the central control unit 14 with the set code specific to the system, the code will be allowed to be written in the memory means of the terminal unit. In this case, the state of the set mode achieved is transmitted from the central control unit 14 through the two-wire line 13 to the terminal units. At the terminal units, as will be clear when referring to FIG. 9, the data writing in the memory means is carried out with the optical wireless signal only in the setting mode.

According to still another feature of the present invention, there is taken a measure for carrying out in a simpler manner the selection and setting of the function with respect to the terminal units which are respectively capable of attaining commonly a variety of the functions and of changing over the function. Referring to FIG. 10, a terminal unit 90 in this embodiment comprises a plurality of input/output means 102a, 102b . . . 102n connected in place of the switch SW and light emitting diodes LD1 and LD2 in the terminal unit 30 of FIG. 3, for connection of any proper input/output device or equipment to the means 102a, 102b . . . 102n. In an optical wireless signal Sr to be transmitted from an operating means 91 to the terminal unit 90, there are included, in correspondence to the setting mode of the data writing in a memory means 94 as well as the confirmation mode of the data reading out of the memory means 94, an administration code SL for selecting whether the memory means 94 is either in the data setting mode or data confirmation mode, a target code OJ for appointing a function number assigned to every type of the functions settable in the respective terminal units, and setting data codes DT1 and DT2 for appointing set contents of the respective functions, as shown in FIG. 11, and the function number appointed by the target code OJ is made to correspond in pairs to absolute address in the memory means one by one. Other arrangements and operation are the same as those in the embodiment of FIG. 3 and the same constituents as those in the embodiment of FIG. 3 are denoted by the same reference numerals but as added by 60.

Figure 13:
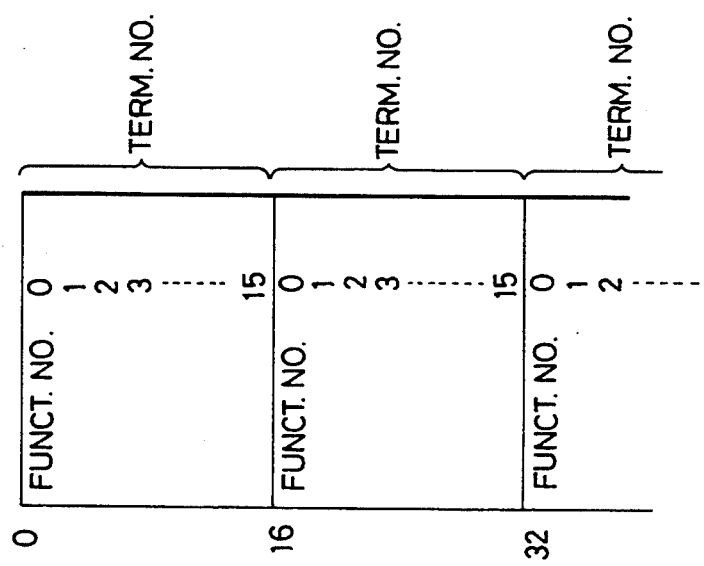
FIG. 13 is a diagram showing an example of memory arrangement in the system of FIG. 10.

More specifically, the target code OJ for appointing the function number comprises preferably a terminal number NT indicating which one of the input/output means 102a, 102b . . . 102n to which a plurality of input/output devices are connected is to be appointed, and a function number NF given to every type of the functions settable in the terminal unit 90, as shown in FIG. 12. Therefore, when it is intended, for example, to render one of the terminal units which is connected at the input/output means 102a to a switch to be corresponding to another terminal unit connected at the input/output means 102b to a load, the terminal number NT corresponding to the input/output means 102a is given to the terminal unit connected to the switch to set the function of this unit, while the terminal number corresponding to the input/output means 102b is given to the terminal unit connected to the load to set its function. The absolute address of the memory means 94 is so set as to coincide with the target code OJ, that is, as shown in FIG. 13, the memory means 94 is provided with block zones divided for every terminal number NT, the zones respectively including slots formed to respectively correspond to each of the function numbers while the data corresponding to the setting data codes DT1 and DT2 are written in the respective slots. Further, these slots in each block zone are subjected fixedly to an allocation in correspondence to the function numbers NF in such manner that "0" address is of the address for the terminal unit, "1" address is of the type of the terminal unit, "2" address is of input polarity and so on. Accordingly, the appointment of the absolute address of the memory means 94 with the value appointed by the target code OJ will inherently appoint the slots corresponding to the terminal number NT and function number NF also appointed by the target code OJ.

Since in this case the terminal number NT corresponds to the number of the zone in the memory means 94 and the function number NF corresponds to the address of the slot in each zone, the writing in the memory means 94 can be attained by appointing the target code OJ of the optical wireless signal Sr from the operating means 97 simply as the absolute address of the memory means 94. Further, when the transmission signal is sent out of the central control unit 14 of FIG. 1, the slots in which the addresses are written for every zone are searched and, in the presence of coincidence of the written address to that sent from the central control-unit 14, the function of the terminal unit 90 is set in accordance with the contents in the particular zone, to have a predetermined operation carried out.

Figure 14:
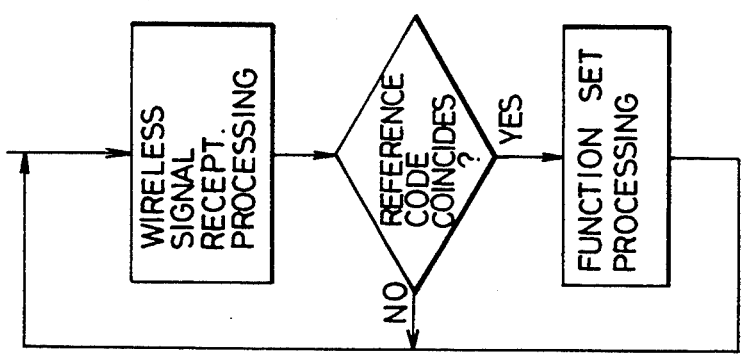

It is preferable that the terminal unit 90 is so arranged that a collating code data are set preliminarily therein in response to the use of the terminal unit 90, for example, the type of the terminal unit. That is, the collating code data are set in accordance with the use of the respective terminal units, in such that "0" is set for the wall switches, for example, corresponding each to each of the loads, "1" for the switches in the case where the loads are forming a group in respect of a building floor or room, "2" for a case in which the loads are forming a pattern, "3" for a case where supervisory input is a no-voltage contact input, "4" for a case where control output is a relay-driving output, and so on. Further, when the collating code data are altered in response to the use of the terminal unit 90 and a collating code corresponding to the collating code data is contained in the optical wireless signal from the operating means 91, it is made possible to determine whether or not the function setting is to be carried out in response to whether or not the collating code coincide with the collating code data, as shown in FIG. 14, whereby any erroneous function setting can be prevented due to that no collating code coincident to any erroneous setting is provided.

Figure 15:
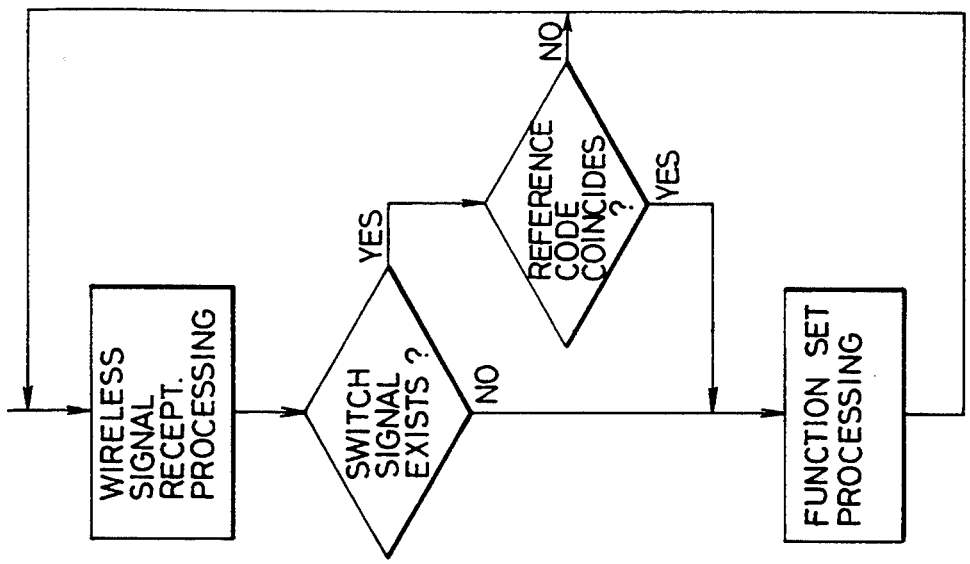
FIGS. 14 to 19 are flow charts for explaining respectively the operation of the system of FIG. 10.

On the other hand, the above collating code data are required for determining the function of the terminal unit 90 but is not required for setting the address of the terminal unit 90, and whether or not the collation is necessary should preferably be selected in accordance with the contents of the setting. In this event, the operating means 91 is so arranged that the optical wireless signal transmitted from the operating means 91 will contain a switch signal appointing whether or not the collation between the collating code data and the collating code is to be carried out. When the optical wireless signal is made to contain the switch signal, it is made possible to confirm the presence or absence of coincidence between the collating code data and the collating code at the time when the collation is appointed by the switch signal to be necessary but, when the switch signal appoints that the collation is not required, the function setting may be carried out unconditionally, as shown in FIG. 15.

Figure 16:
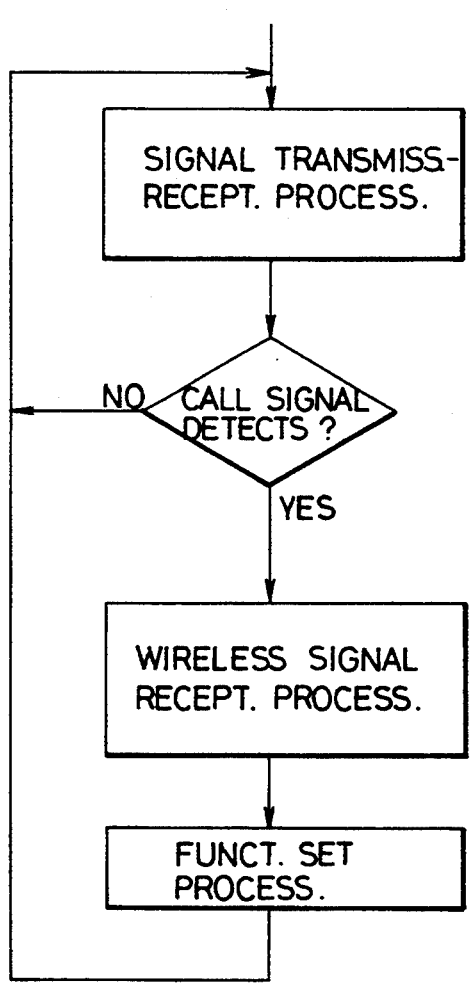
Figure 17:
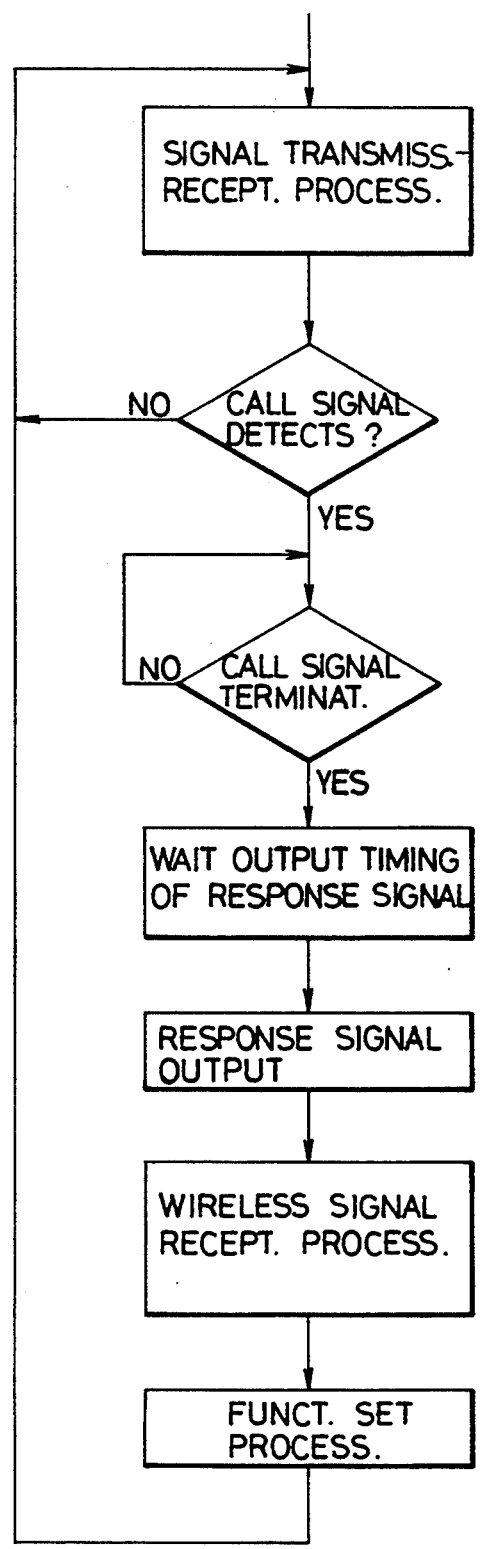
Figure 18:
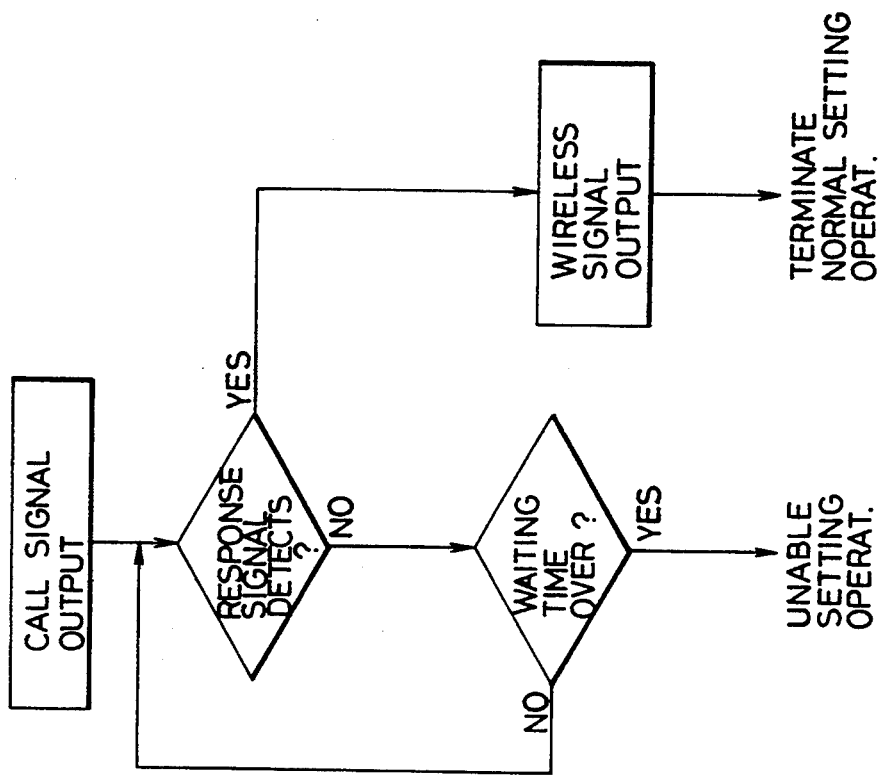

Further, it is preferable that a call signal is added to initial stage of the optical wireless signal from the operating means 91 so that the terminal unit 90 will be changed over to a state where the unit is ready to receive the optical wireless signal. With this addition of such call signal, as shown in FIG. 16, it is made possible to detect the presence or absence of the call signal during the processing of the signal transmission and reception with respect to the transmission signal at the terminal unit 90 and, upon presence of the call signal, the transmission and reception of the transmission signal are interrupted to have the optical wireless signal received. Further, as shown in FIG. 17, a response signal is contained as the optical wireless signal from the terminal unit 90, with respect to the call signal. With this response signal contained, it is made possible, as shown in FIG. 18, to decide if the function setting with respect to the terminal unit 90 is normally and accurately carried out, by judgement whether or not the response signal is present within a predetermined time.

Figure 19:
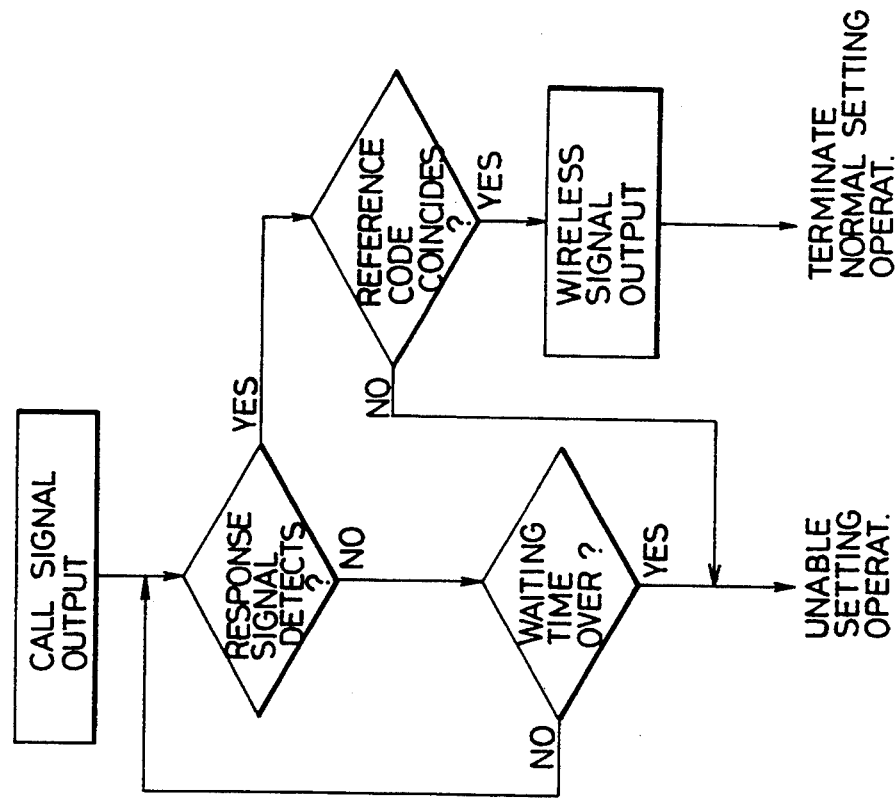

Here, the foregoing collating code data can be employed as the response signal, in which event, as shown in FIG. 19, the collating code data returned to the operating means 91 as the response signal are collated with the collating code in the operating means 91 and, if their coincidence is present, it is judged that the setting is possible and the function setting operation is continued. When their inconsistency is detected, the function setting can be interrupted at the moment of the detection, and the operator can detect the inconsistency of the collating code already at the initial stage of the setting operation of the function. When it is intended to set the same function for a plurality of the terminal units different in the collating code data, the arrangement should optimumly be made such that the collating code data returned as the response signal are subjected to a judgement whether or not they are of the type settable and, if settable, the particular collating code data are transmitted as the collating code from the operating means 91 to the respective terminal units 90. When the collating code data of the terminal units 90 are not clear, further, the collating code data returned as the response signal are made to be transmitted from the operating means 91 as the collating code at the time of the setting, so that the setting operation of the function can be carried out for the terminal units 90 even when their collating code data are not clear, as will be readily appreciated.

According to still another feature of the present invention, there can be provided an area setting system adapted to a case where the terminal units are employed as human body detecting sensor units. Referring to FIG. 20, a human body sensor unit 110 in an embodiment for this feature has a light receiving element 110a to which the optical wireless signal is transmitted from an optical wireless transmitter 111 forming an operating means through its light emitting element 111a. The sensor unit 110 includes a signal processing means 112 to which the received signal is provided as a detection output of a sensor 115 through an optical wireless signal receiving means 113 coupled to the light receiving element 110a and a detecting area controlling means 114 connected between the receiving means 113 and the sensor 115. More specifically, the wireless transmitter 111 transmits a detecting area signal to the sensor unit 110, this signal is demodulated at the signal receiving means 113, and this demodulated signal is employed for controlling the detecting area as a direction control signal provided out of the detecting area controlling means 114 to the sensor 115 for controlling sensing direction in a range from horizontal direction to vertical direction, to thereby attain the human body detection by means of the sensor 115 with respect to a desired area. The detecting area setting as well as its modification can be thus achieved by means of the optical wireless transmitter 111 from a remote position from the human body sensor unit 110.

According to yet another feature of the present invention, there is provided a sensitivity controlling system adapted to a case where the terminal units are employed as a fire detecting sensor unit. Referring to FIG. 21, a fire sensor unit 130 in another embodiment for the present feature receives at its light receiving element 130a the optical wireless signal transmitted from a light emitting element 131a of an optical wireless transmitter 131 forming the operating means. The sensor unit 130 includes a signal processing means 132 to which a fire detection signal is provided from a sensor 133. The transmitter 131 also transmits a sensitivity and time data signal for controlling the sensitivity of the sensor 133 of the sensor unit 130, the data signal received by the sensor unit 130 is demodulated at an optical wireless signal receiving means 134, and this demodulated signal is provided into a nonvolatile memory 135 where the demodulated signal can be stored for being read out by a sensitivity-schedule setting means 136. To this setting means 136, a timing signal is being provided from a timer means 137, while the detection signal from the sensor 133 is processed at the signal processing means 132 in response to an output from the sensitivity-schedule setting means 136.

Figure 22:
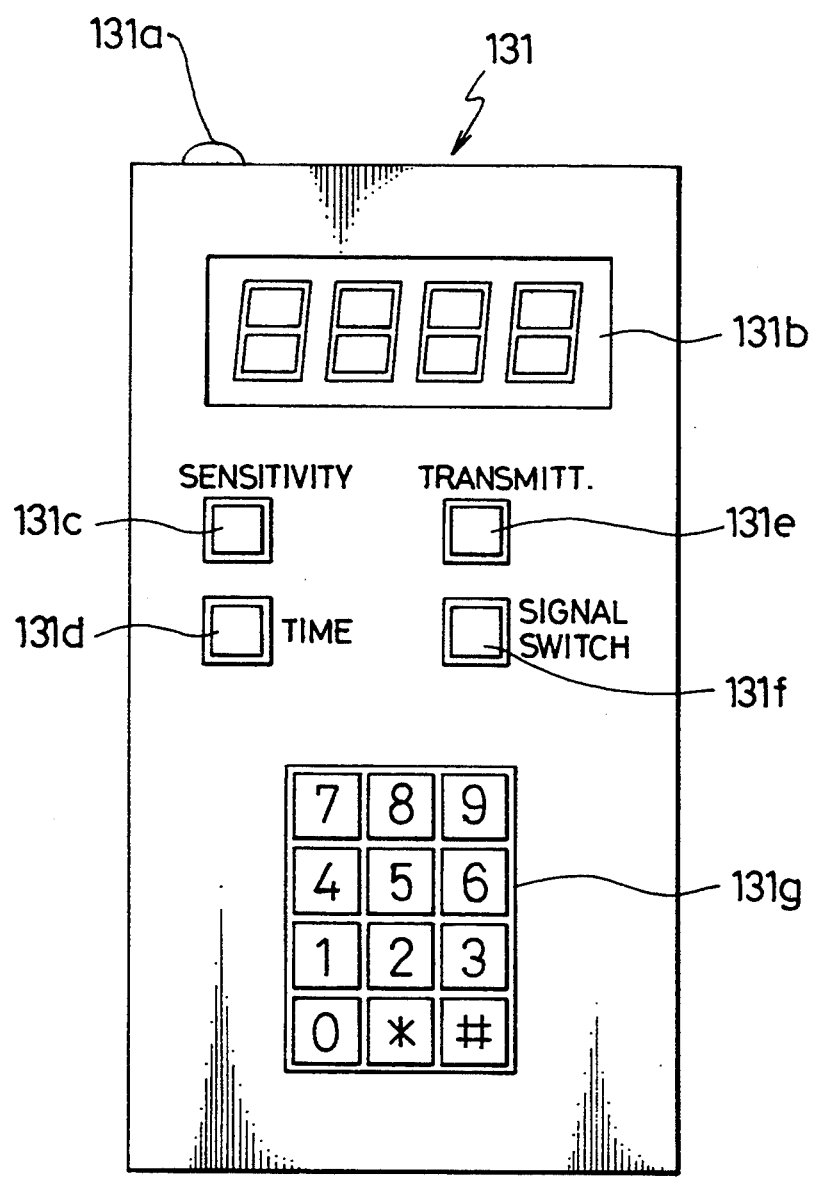
FIG. 22 shows in a plan view an example of an operating panel of the terminal unit in the system of FIG. 21.

Now, it is assumed here that the sensitivity of the sensor 133 is set by such optical wireless transmitter 131 as shown in FIG. 22 to be the lowest (for example, level 0) for a time band from 8.00 a.m. to 8.00 p.m. and to be the highest (for example, level 10) from 8.00 p.m. to 8.00 a.m. Then, the operator initially inputs "0" with ten keys 131g and confirms this "0" input with a monitoring display 131b and thereafter a sensitivity setting switch 131c is operated, upon which the display on the display 131b is cleared, and the sensitivity data "0" are stored in an internally provided memory (not shown). The operator inputs next time data "0800" by the ten keys 131g and confirms this with the monitoring display 131b, and thereafter a time setting switch 131d is operated to have the display on the display 131b cleared and the time data stored in the internal memory. In the same sequence, sensitivity data "10" and time data "2000" are stored in the memory, and then the signal of all of these sensitivity and time data stored is transmitted from the wireless transmitter 131 through its light emitting element 131a to the fire sensor unit 130, by operating a transmitting switch 131e.

The thus transmitted optical wireless signal is trapped at the light receiving element 130a of the fire sensor unit 130, the signal receiving means 134 demodulates the sensitivity data "0" and "10" and the time data "0800" and "2000" and these demodulated data are stored in the nonvolatile memory 135. The sensitivity-schedule setting means 136 is receiving from the timer means 137 the timing signal and, upon coincidence of the timing signal with the time data "0800", the sensitivity data "0" corresponding to this time data "0800" are provided to the signal processing means 132, where alarm output level of the means 132 is modified on the basis of the data "0". Accompanying this, the sensitivity of the sensor 133 is caused to be varied in equivalent manner. At this time, the sensitivity data "0" are maintained until coincidence of the timing signal with the time data "2000" and, upon such coincidence of the timing signal with the time data "2000", the sensitivity data will become "10" to be the highest sensitivity. In the present instance, the sensitivity can be promptly changed over irrespective of the time, by means of, for example, an input of the sensitivity data given with the ten keys 131g operated and an operation of the transmitting switch 131e without any input of the time data.

Therefore, the present embodiment also allows the sensitivity and time data freely modified at a remote position from the fire sensor unit 130.

Figure 23:
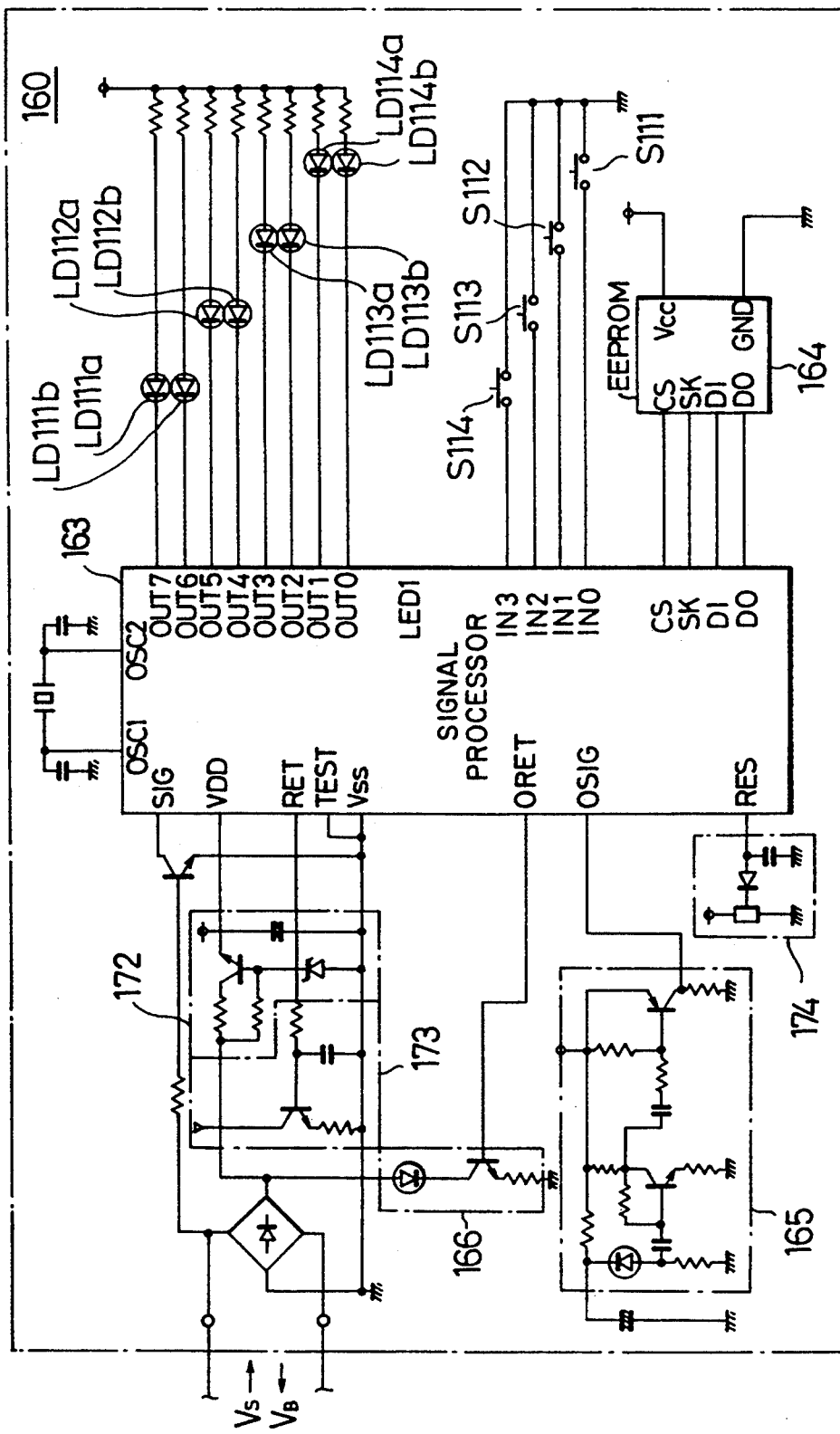
FIGS. 23 and 24 are circuit diagrams showing examples of practical circuit arrangements for the supervisory and controlling terminal units.

For a practical circuit arrangement of the terminal units employable in the system of the foregoing embodiments, there is shown in FIG. 23 an example of such circuit arrangement, in which a terminal unit 160 forms a supervisory terminal unit designed to supervise such switches S111–S114 as a wall switch ON and OFF states of which are displayed by means of light emitting diodes LD111a, LD111b ... and LD114a, LD114b ... arranged in pairs. In this case, other constituents are substantially the same as those in the supervisory terminal unit shown in FIG. 3 and are denoted in FIG. 23 by the same reference numerals as those in FIG. 3 but as added by 130. In the present terminal unit 160, it is preferable that the light emitting means 166 is provided to be actuated through a power source circuit 172 and a return circuit 173, and the signal processor 163 is additionally provided with a reset circuit 174.

Figure 24:
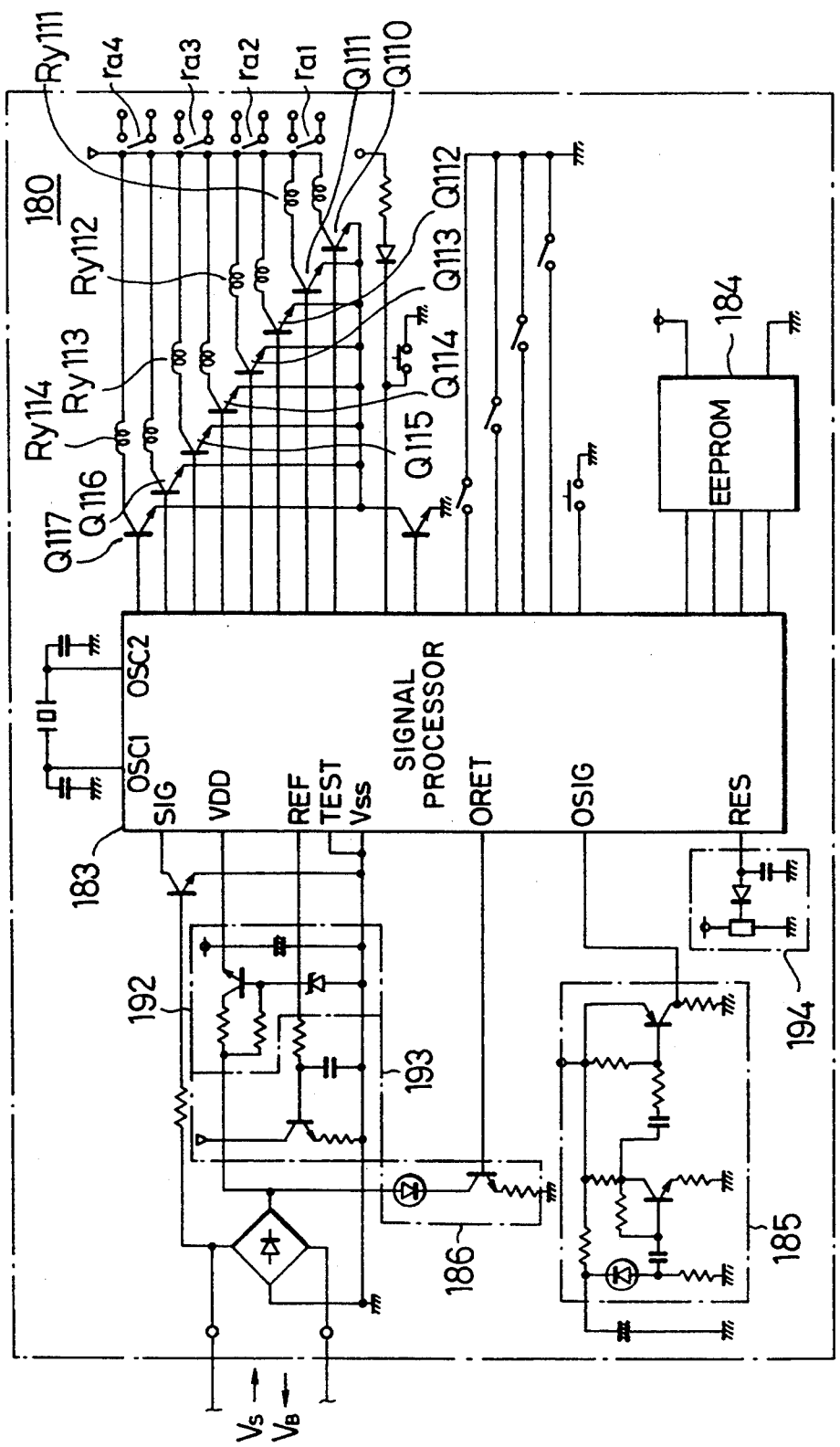

Further, an example of practical circuit arrangement for the controlling terminal units and also employable in the foregoing embodiments is shown in FIG. 24, in which a controlling terminal unit 180 includes latching relays RY111–RY114 which are set and reset through driving transistors Q110–Q117. In the present instance, other constituents are substantially the same as those in the controlling terminal unit shown in FIG. 5 and are denoted in FIG. 24 by the same reference numerals as those used in FIG. 5 but as added by 130. In the present terminal unit 180, too, the light emitting means 186 is to be actuated through a power source circuit 192 and a return circuit 193, and the signal processor 183 has a reset circuit 194.

What is claimed is:

1. A data setting system for terminal units in a remote supervisory and controlling system, comprising:

a central control unit;

a plurality of said terminal units connected to said central control unit through a two-wire signal line, each of said terminal units having a set address, a plurality of operational modes, and a plurality of functions operating according to function data values;

means for carrying out a time-divisional multiplex data transmission between said central control unit and said terminal units, or between the respective terminal units with transmissions transmitted from the central control unit to the respective terminal units or from one of the terminal units to the central control unit or other terminal units, said central control unit supplying through said two-wire signal line, a source of power to the respective terminal units, and said transmissions including at least an address data signal from one of the control and terminal units for calling another of the units, a control data signal from said one unit to said another unit called and a supervisory data signal from said another unit called to said one unit; and operating means provided separately from said terminal units for preparing an optical wireless signal for transmission to said terminal units, said optical wireless signal comprising said function data values, data representing one of said operational modes, and setting mode data, said setting mode data representing one of a data setting mode and a confirmation only mode;

each of said terminal units comprising:

a memory for storing said function data values;

light receiving means for receiving said optical wireless signal from said operating means;

means for sending to said operating means said function data values stored in said memory in response to said received optical wireless signal via a return optical wireless signal; and signal processing means which processes said received optical wireless signal for switching an operational mode of the terminal unit on the basis of said function data values stored in said memory and said data representing said one of said operational modes from said received optical wireless signal, said signal processing means being operable in said data setting mode to write said function data values in said memory responsive to said setting mode data in said optical wireless signal indicating said data setting mode and operable in said confirmation only mode to read out function data stored in said memory and send it to said operating means via said return optical wireless signal responsive to said setting mode data indicating said confirmation only mode;

wherein said central control unit stores a reference code specific to said data setting system, and said optical wireless signal further comprises collating code data set in accordance with specific uses of each of the terminal units and a code specific to the data setting system which corresponds to the reference specific code stored in said central control unit for judgment at the central control unit of coincidence of said optical wireless signal received with said specific code stored in said central control unit, and wherein said system comprises means for preventing operation in said data setting mode when said specific code in said optical wireless signal does not coincide with said reference specific code stored in said central control unit, and means for determining whether said collating code in said received optical wireless, signal coincides with said collating code data in said memory of said terminal units and for preventing operation of said data setting mode if said collating code does not coincide with said collating code data.

2. A data setting system according to claim 1, wherein said received optical wireless signal comprises a switch signal and said system comprises means for selectively operating said means for determining in response to said switch signal.

3. A data setting system according to claim 1, wherein said optical wireless signal of said operating means includes a call signal for changing a called one of the terminal units over to a state ready to receive said optical wireless signal, and said function data sending means of each of said terminal units also sends an optical wireless signal including a response signal responding to said call signal from the operating means.

4. A data setting system according to claim 1, wherein one of the operational modes of at least one of said plurality of terminal units comprises a supervisory terminal unit including a wall switch.

5. A data setting system according to claim 1, wherein one of the operational modes of at least one of said plurality of terminal units comprises a controlling terminal unit including a relay.

6. The data setting system according to claim 1, wherein said data representing one of said operational modes includes data representing a data setting mode for writing said data to said memory of said terminal units and a data retrieval mode for retrieving said data stored in said memory, wherein said means for sending sends said data stored in respective ones of said memories of said terminal units when said data representing one of said operational modes represents said data retrieval mode.

7. A data setting system for terminal units in a remote supervisory and controlling system, comprising:

a central control unit;

a plurality of said terminal units connected to said central control unit through a two-wire signal line, each of said terminal units having a set address, a plurality of operational modes, and a plurality of functions operating according to function data values;

means for carrying out a time-divisional multiplex data transmission between said central control unit and said terminal units, or between the respective terminal units with transmissions transmitted from the central control unit to the respective terminal units or from one of the terminal units to the central control unit or other terminal units, said central control unit supplying, through said two-wire signal line, a source or power to the respective terminal units, and said transmissions including at least an address data signal from one of the control and terminal units for calling another of the units, a control data signal from said one unit to said another unit called and a supervisory data signal from said another unit called to said one unit; and an operating means provided separately from said terminal units for preparing an optical wireless signal for transmission to said terminal units, said optical wireless signal including said function data values, data representing one of said operational modes, a reference specific code, and a collating code set in accordance with specific uses of each of the terminal units;

each of said terminal units comprising:

a memory for storing said function data values, a specific code specific to the data setting system for judgement of coincidence between said reference specific code in said optical wireless signal received from said operating means and said specific code, and collating data representing a specific use of the terminal unit for judgement of coincidence between said collating code in said optical wireless signal and said collating code data;

a light receiving means for receiving means for receiving said optical wireless signal from said operating means;

a signal processing means, responsive to receipt of said optical wireless signal, for storing said function data values in said memory upon judgement of coincidence between said reference specific code in said optical wireless signal and said stored specific code and between said collating code in said optical wireless signal and said stored collating code data; and means for sending to said operating means said function data values stored in said memory in response to said received optical wireless signal;

wherein said signal processing means processes said received optical wireless signal for switching an operational mode of the terminal unit on the basis of said function data values stored in said memory and said data representing said one of said operation modes from said received optical wireless signal.

8. A data setting system according to claim 7, wherein said memory of said terminal units further stores address data.

9. A data setting system according to claim 7, wherein said memory of said terminal units comprises a nonvolatile memory of EEPROM.

10. A data setting system according to claim 7, wherein said plurality of operational modes of said terminal units comprises a wall switch connected to a supervisory terminal unit and a relay connected to a controlling terminal unit.

11. A data setting system according to claim 7, wherein said plurality of functions of said terminal units comprise at least one of input polarity, input latch mode, input sampling time, output polarity, output mode, output time, reply signal mode, dimming mode, one-shot lighting, delayed lighting and delay time.

12. A data setting system according to claim 7, wherein said plurality of operational modes of said terminal units comprises a fire and security sensor.

13. A data setting system according to claim 12, wherein said plurality of functions comprise at least a detection sensitivity adjustment.

14. A data setting system according to claim 12, wherein said plurality of functions comprise at least a sensitivity schedule setting.

15. A data setting system according to claim 14, wherein said optical wireless signal comprise sensitivity and timing data.

16. A data setting system according to claim 7, wherein said optical wireless signal includes an administration code for selecting one of a setting mode of writing said data in said memory and a confirmation mode of reading the data out of the memory, a target code for appointing a function number assigned to every type of function settable to respective said terminal units, and a setting data code for appointing setting contents of said functions.

17. A data setting system according to claim 7, wherein said optical wireless signal of said operating means includes a call signal for changing a called one of the terminal units over to a state ready to receive said optical wireless signal, and said function data sending means of each of said terminal units also sends an optical wireless signal including a response signal responding to said call signal from the operating means.

18. A data setting system according to claim 7, wherein said system comprises means for preventing the system from being placed in a setting mode if said collating code does not coincide with said collating code data:

19. A data setting system according to claim 18, wherein said received optical wireless signal comprises a switch signal and said system comprises means for selectively operating said means for determining in response to said switch signal.

* * * * *